May 27, 1947.  H. T. TORNBERG  2,421,132
TENSION EQUALIZER FOR PLASTIC EXTRUDERS
Filed Oct. 25, 1945  2 Sheets-Sheet 1
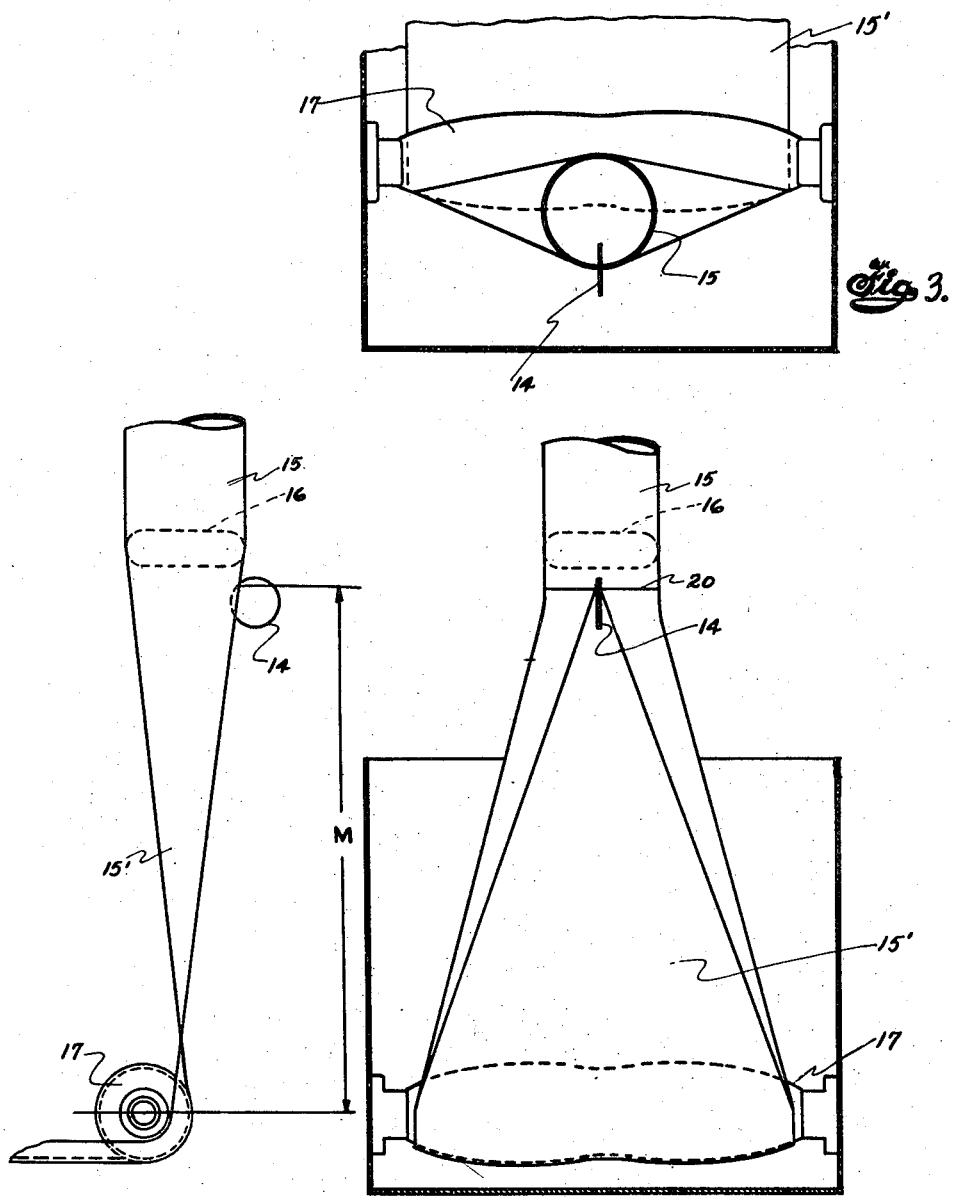
INVENTOR
HENNING T. TORNBERG
by
ATTORNEY May 27, 1947.  H. T. TORNBERG  2,421,132
TENSION EQUALIZER FOR PLASTIC EXTRUDERS
Filed Oct. 25, 1945  2 Sheets-Sheet 2
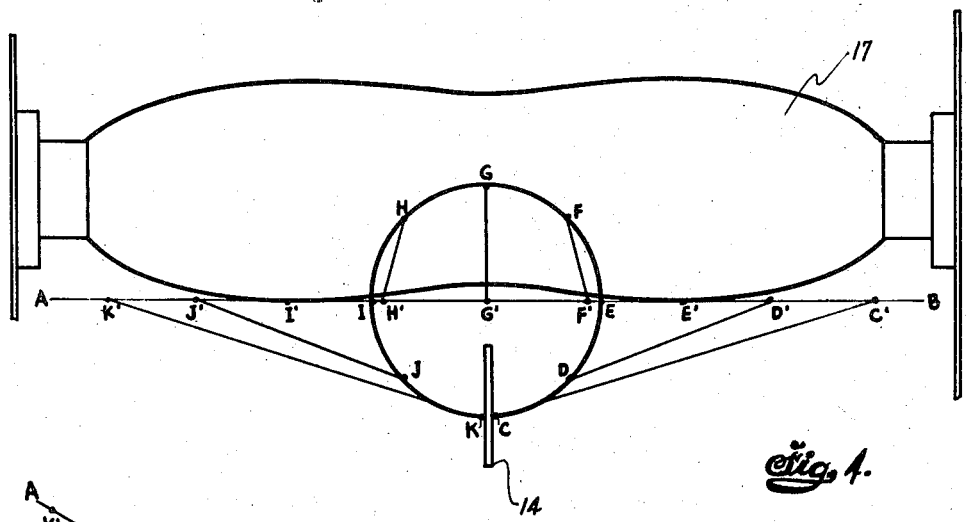
Fig. 4.
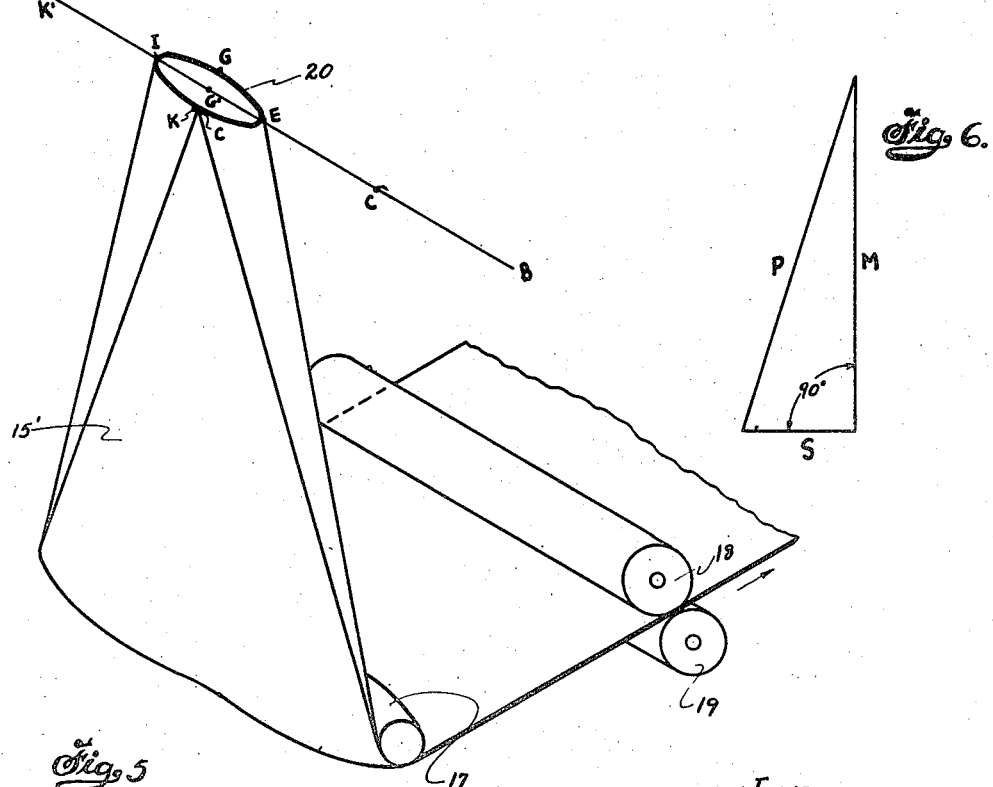
Fig. 5.
Fig. 6.
INVENTOR
HENNING T. TORNBERG
by
ATTORNEY Patented May 27, 1947

2,421,132

UNITED STATES PATENT OFFICE 2,421,132

TENSION EQUALIZER FOR PLASTIC EXTRUDERS

Henning T. Tornberg, Ridgewood, N. J., assignor to Modern Plastic Machinery Corporation, Wilmington, Del., a corporation of Delaware Application October 25, 1945, Serial No. 624,385

2 Claims. (Cl. 18—14)

The present invention relates to plastic extrusion machines of the type for extruding a tube of appreciable diameter, then slitting the tube as it is extruded and finally flattening out the slit stock as a web of sheet material.

Flattening the slit tube into a web is usually carried out by a system of rollers. It is evident that every point on the circumference of the tube determining the circle in the plane normal to the tube at the slitting point, will have a different distance of movement to the respective positions they assume on a straight line across the flattened web. Since the rollers pull on the web, it is essential that proper tension be exerted everywhere on the material being flattened to insure that the web shall be of uniform thickness.

An object of this invention is to provide a roller system of novel and improved construction, which accomplishes the proper exertion of tension everywhere on the material being flattened so that the web be of uniform thickness.

A further object hereof is to provide in a machine of the character described, a novel and improved roller system which effectively accomplishes the aforementioned purpose for which it is designed.

Other objects and advantages will become apparent as this disclosure proceeds.

In the accompanying drawings forming part of this application, similar characters of reference indicate corresponding parts in all the views.

Fig. 1 is a diagrammatic representation of a tubular form issuing from an extrusion machine, shown as it is being slit lengthwise and the web thus formed received flattened on an idler roller which is an embodiment of the present invention.

Fig. 2 is a side view of Fig. 1.

Fig. 3 is a top view of Fig. 2.

Fig. 4 is Fig. 3 shown in part and enlarged.

Fig. 5 shows part of Fig. 2 in perspective.

Fig. 6 is a mathematical diagram to illustrate a computation to aid in the determination of what the diameter of said roller should be at any point along its length.

In the drawings, the numeral 15 indicates a tubular form of circular cross-section, issuing downwardly from a plastic extrusion machine, a component 16 of which machine is shown interior said tube 15, having the function to determine the final diameter said extruded tube leaves the machine before said tube in its downward movement is caused to be longitudinally slit, by for instance the rotary saw 14. After being so slit, the extruded material is flattened into a web 15' as it is received in single ply onto the idler roller 17 and fed away through the rollers 18 and 19, to be wound up or otherwise dealt with.

It is with the design of the idler roller 17 that this invention is concerned. I find that the web 15' has proper tension everywhere on it by the rollers 18 and 19, to insure flattening of the slit tube into a single ply web of uniform thickness delivered to said rollers 18 and 19, if said idler roller 17 embodies the following teachings.

I design the idler roller 17 in such manner that the distance from any point in the wall of the tube lying in the circumference of the circle 20 determined by a plane normal to the tube 15 at the slitting point, to the point contacted on the idler roller 17 by said circumference point in the travel of the protruded material 15', plus the distance along the periphery of the idler roller said circumference point remains in contact with the idler roller, is substantially a constant for all points comprising the circumference of said circle 20.

It is good practice that all points of the circumference of the circle 20, shall have a minimum of travel in assuming a straight line relation. So assuming for the moment an idler roller of uniform diameter, this purpose is accomplished when the idler roller is positioned so that a plane through the longitudinal axis of the tube 15 tangent to said idler roller assumed, is symmetrical with respect to the contacting points designated by the letters C and K at the slit in said circumference.

Now assume that points designated respectively by the letters D, E, F, G, H, I and J, divide the circumference of circle 20 into eight equal parts. In unfolding said circumference to assume a straight line which may be indicated by AB determined by points E and I in the plane mentioned in the preceding paragraph, said points including C and K will need travel to assume positions on said line AB indicated respectively by their letters primed. Point C, in its travel to point C', will need travel a distance equal to line CC', and likewise each of said specifically designated points will travel distances equal in each instance to the distance from its position on the circumference of the circle 20, to its position assumed on line AB. This unfolding movement did not take into account movement of said points to contact with the idler, which for the purpose of simplifying computations will be assumed of uniform diameter.

The actual distance travelled by each of such points until it contacts with the idler, will be the length of the hypotenuse P of a right triangle whose sides are the distance M, and the distance indicated generally as S which such point need travel in the unfolding of said circumference to a straight line AB considered in the plane of said circle 20. For actual computations, the circle 20 has its circumference divided into as large number of parts as is practical, and the value of P determined for each point of such division. It will be found that the value of P for points E and I will be the least, and for points C and K evidently the greatest.

For the convenience of this explanation, the angle of contact of the web 15' with the idler roller 17, is made ninety degrees; the rollers 18 and 19 being so positioned with respect to said idler roller to effect such quarter circumference contact.

As mentioned, it is desired that the distance travelled by any point from its position in the circumference of circle 20, to the point it leaves the idler roller 17, be a constant for all points of said circumference.

The diameter of the idler roller 17 at the position of points E and I being identical and assumed, the diameters at positions of all other points along the idler roller can now be computed to follow the above requirement, for the constant for said points in each instance is the value of P for point E plus one-fourth of the circumference of the circle of the aforesaid assumed diameter. From such constant, subtract the value of P for any other point, and the difference will be one fourth of the circumference of the idler roller 17 for such other point's position along the idler. This is done for all points in the circumference of circle 20. A template can then be made of the required contour of the idler roller 17, and such a roller can then be machined to conform.

Though this method of computation is not geometrically perfect, it will suffice for all practical purposes. For greater accuracy a circle 20 may be drawn exterior the tube 15 to be visible as the web 15' passes the idler roller 17 made as above, and its line circumferences shaved as may be required so that such marked line leaves contact from the idler roller 17 in a straight line parallel to the axis of said idler roller.

This invention is capable of numerous forms and various applications without departing from the essential features and teachings herein disclosed. It is therefore intended and desired that the specific embodiment herein be deemed illustrative and not restrictive and that the patent shall cover all patentable novelty herein set forth; reference being had to the following claims rather than to the particular description herein to indicate the scope of this invention.

I claim:

1. In combination, a plastic extruder adapted to extrude a plastic material in the form of a tube, a slitting means positioned to slit the wall of the tube at a point after the tube leaves the extruder die, an idler roller adapted to receive the material of the slit tube in web form and have contact therewith through a predetermined angle of rotary movement and a roller means adapted to receive said web after it leaves its contact with the idler roller and pull said web away from the extruder; the contour of said idler roller being such that the distance from any point in the wall of the tube lying in the circumference of the circle determined by a plane normal to the tube at the slitting point, to the point contacted on the idler roller by said circumference point in the travel of the extruded material, plus the distance along the periphery of the idler roller said circumference point remains in contact with the idler roller, is substantially a constant for all points comprising the circumference of said circle.

2. A combination as defined in claim 1, wherein a pair of diametrically opposite points on said circle are each ninety degrees from the slitting point and lie in a plane tangent to the idler and parallel with the longitudinal axis of the tube issuing from the extruder.

HENNING T. TORNBERG.

REFERENCES CITED

The following references are of record in the file of this patent:

UNITED STATES PATENTS

| Number | Name | Date |
|---|---|---|
| 1,435,659 | Roberts | Nov. 14, 1922 |
| 1,769,730 | Wetmore | July 1, 1930 |
| 1,993,349 | Parkhurst | Mar. 5, 1935 |
| 2,177,633 | Blackard | Oct. 31, 1939 |
| 2,324,645 | Prehler | July 20, 1943 |
| 2,287,282 | Tousley | June 23, 1942 |
| 2,358,376 | Banigan et al. | Sept. 19, 1944 |